United States Patent
Chang et al.

(10) Patent No.: US 12,100,240 B1
(45) Date of Patent: Sep. 24, 2024

(54) FINGERPRINT RECOGNITION DRIVING DEVICE

(71) Applicant: HIMAX TECHNOLOGIES LIMITED, Tainan (TW)

(72) Inventors: Yaw-Guang Chang, Tainan (TW); Jia-Ming He, Tainan (TW); Zong-You Hou, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 18/358,047

(22) Filed: Jul. 25, 2023

(51) Int. Cl.
*G06V 40/13* (2022.01)

(52) U.S. Cl.
CPC ................. *G06V 40/1318* (2022.01)

(58) Field of Classification Search
CPC .......... G06V 40/1318; G06V 40/00–1394
See application file for complete search history.

(56) References Cited

U.S. PATENT DOCUMENTS

| | | | | |
|---|---|---|---|---|
| 2021/0098537 A1* | 4/2021 | Krah | ................. | G06F 3/0421 |
| 2021/0303811 A1* | 9/2021 | Chung | ............... | G06V 40/1318 |
| 2023/0094533 A1* | 3/2023 | Krah | ................. | G06F 3/042 |
| | | | | 345/174 |
| 2023/0168282 A1* | 6/2023 | Lin | ............... | G01R 1/30 |
| | | | | 324/123 R |

\* cited by examiner

Primary Examiner — Premal R Patel
(74) Attorney, Agent, or Firm — JCIPRNET

(57) ABSTRACT

A fingerprint recognition driving device includes a plurality of light sensors and a plurality of signal processing circuits. The light sensors respectively generate a plurality of sensing signals. The signal processing circuits respectively coupled to the light sensors, for processing the sensing signals to generate a plurality of processed sensing signals. During each of a plurality of sensing periods, one of the signal processing circuits provides corresponding processed sensing signal with a first polarity, and each of the other signal processing circuits provides corresponding processed sensing signals with a second polarity, and the first polarity is different from the second polarity. The signal processing circuits generates an output signal according to the processed sensing signals.

18 Claims, 12 Drawing Sheets

FINGERPRINT RECOGNITION DRIVING DEVICE

BACKGROUND

Technical Field

The disclosure relates to a fingerprint recognition driving device, and particular to the fingerprint recognition driving device which can improve a signal to noise ratio.

Description of Related Art

In today's electronic products, fingerprint recognition device is more and more widely used. In prior art, a fingerprint recognition chip is used to identify whether the user is authorized or not. For mobile phones, more and more mobile phones have the function of fingerprint recognition. At this time, a place is reserved for placing the fingerprint recognition chip, and if the relevant circuit of the fingerprint recognition can be hidden in the display screen without affecting the original display screen, the mobile phone screen can be more convenient and flexible for using. To realize this idea, optical fingerprint recognition is a solution.

SUMMARY

The disclosure provides a fingerprint recognition driving device, which can improve a signal to noise ratio of a touch detection.

The fingerprint recognition driving device includes a plurality of light sensors and a plurality of signal processing circuits. The light sensors respectively generate a plurality of sensing signals. The signal processing circuits respectively coupled to the light sensors, for processing the sensing signals to generate a plurality of processed sensing signals. During each of a plurality of sensing periods, one of the signal processing circuits provides corresponding processed sensing signal with a first polarity, and each of the other signal processing circuits provides corresponding processed sensing signals with a second polarity, and the first polarity is different from the second polarity. The signal processing circuits generates an output signal according to the processed sensing signals.

Based on the above, the fingerprint recognition driving device of present disclosure converts one of a plurality of sensing signals to generate a processed sensing signal with a first polarity, and converts others of the plurality of sensing signals to generate other processed sensing signals with a second polarity where the first polarity is different from the second polarity. By generating the processed sensing signals with different phases, the fingerprint recognition driving device of present disclosure can enhance strength of the processed sensing signals, and the signal-to-noise ratio of a generated output signal can be improved.

DETAILED DESCRIPTION OF DISCLOSED EMBODIMENTS

Figure 1:
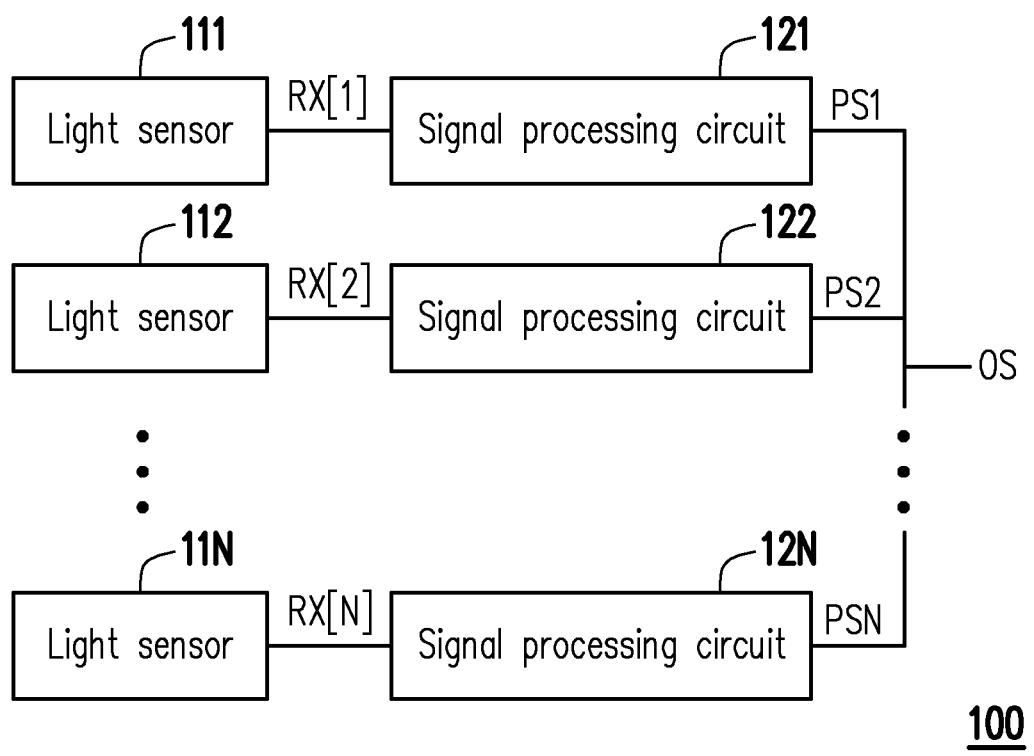
FIG. 1 illustrates a schematic diagram of a fingerprint recognition driving device according to an embodiment of present disclosure.

Please refer to FIG. 1, which illustrates a schematic diagram of a fingerprint recognition driving device according to an embodiment of present disclosure. The fingerprint recognition driving device 100 includes a plurality of light sensor 111 to 11N and a plurality of signal processing circuits 121 to 12N. The light sensor 111 to 11N are respectively coupled to the signal processing circuits 121 to 12N. In present disclosure, the fingerprint recognition driving device 100 may be disposed under a display panel. A user may touch the display panel by finger, and a fingerprint of the user may cover the light sensor 111 to 11N. The light sensor 111 to 11N are configured to sense lights reflected by the fingerprint and respectively generate a plurality of sensing signals RX[1] to RX[N] according to brightness of the reflective lights.

The light sensor 111 to 11N respectively transmit the sensing signals RX[1] to RX[N] to the signal processing circuits 121 to 12N. The signal processing circuits 121 to 12N are respectively configured to process the sensing signals RX[1] to RX[N] to generate a plurality of processed sensing signal PS1 to PSN. In detail, in present disclosure, One of the signal processing circuits 121 to 12N, take the signal processing circuits 121 as an example, may process the corresponding sensing signal RX[1] to generate the processed sensing signal PS1 with a first polarity. Others of the signal processing circuits 121 to 12N, the signal processing circuits 122 to 12N, may respectively process the sensing signals RX[2] to RX[N] to generate processed sensing signals PS2 to PSN with a second polarity. The first polarity is different from the second polarity, and in present embodiment, the first polarity may be positive polarity, and the second polarity may be negative polarity.

In present embodiment, the signal processing circuit 121 may generate the processed sensing signal PS1 by integrating the sensing signal RX[1], and further convert the processed sensing signal PS1 from a positive signal to a negative signal. The signal processing circuits 122 to 12N may integrate the sensing signals RX[2] to RX[N] to respectively generate the processed sensing signals PS2 to PSN, and keep the processed sensing signals PS2 to PSN to positive signals.

In present embodiment, the fingerprint recognition driving device 100 may generate an output signal OS according to the processed sensing signals PS1 to PSN.

Since each of the sensing signals RX[1] to RX[N] of the fingerprint are generally weak, the fingerprint recognition driving device 100 receive the plurality of the sensing signals RX[1] to RX[N] of N channels at a time. Furthermore, the fingerprint recognition driving device 100 generates the processed sensing signal PS1 which has different phase than the generated processed sensing signals PS2 to PSN and can receive signals with different phases. By performing operation on the processed sensing signals PS1 to PSN with multiple phases, noises in the processed sensing signals PS1 to PSN cab be reduced and the signal-to-noise ratio can be improved.

Figure 2:
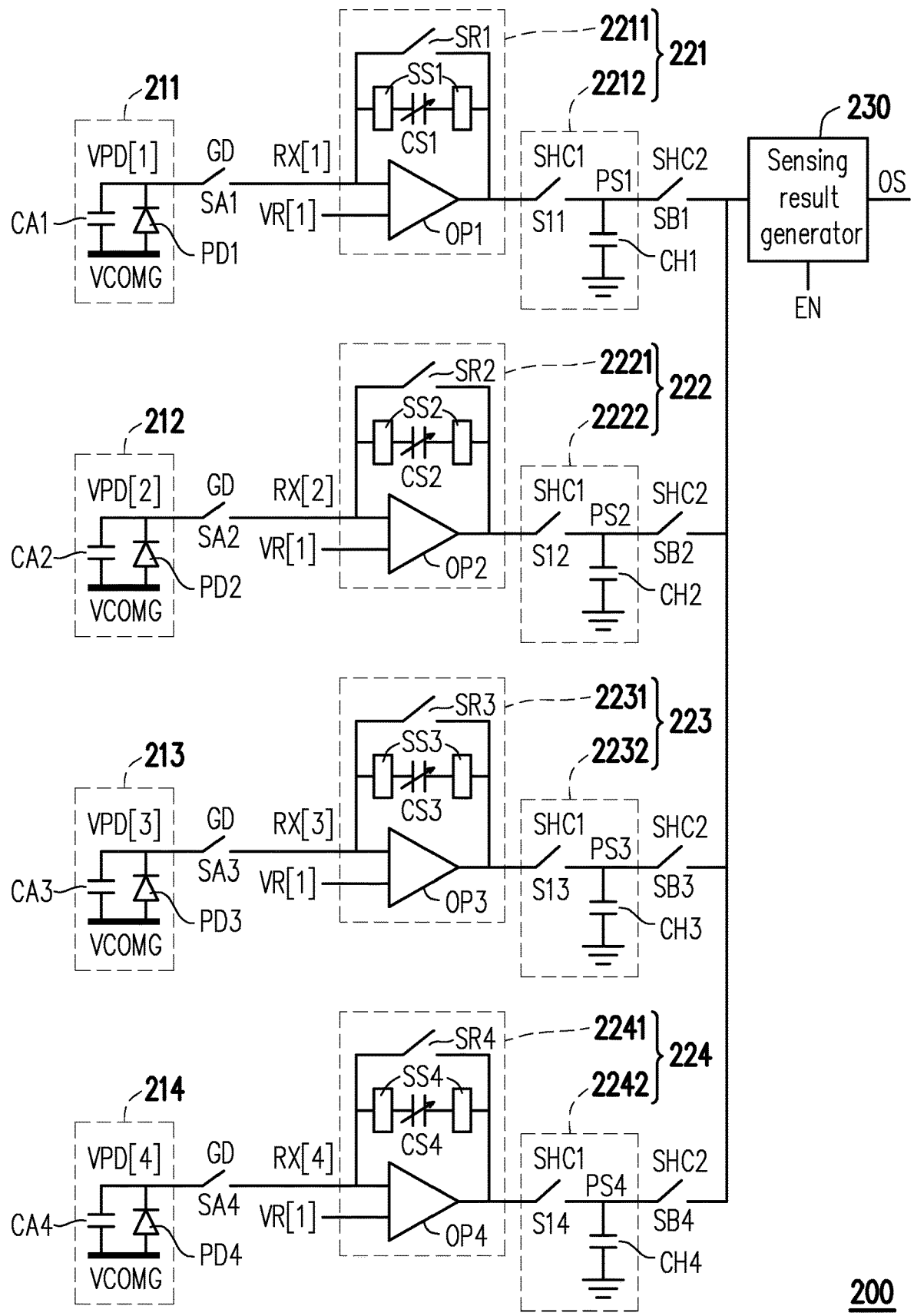
FIG. 2 illustrates a schematic diagram of a fingerprint recognition driving device according to another embodiment of present disclosure.

Please refer to FIG. 2, which illustrates a schematic diagram of a fingerprint recognition driving device according to another embodiment of present disclosure. The fingerprint recognition driving device 200 includes a plurality of light sensor 211 to 214, a plurality of signal processing circuits 221 to 224 and a sensing result generator 230. The light sensors 211 includes a photo diode PD1 and a capacitor CA1; the light sensor 212 includes a photo diode PD2 and a capacitor CA2; the light sensor 213 includes a photo diode PD3 and a capacitor CA3; and the light sensor 214 includes a photo diode PD4 and a capacitor CA4. The photo diodes PD1 to PD4 are respectively coupled to the capacitors CA1 to CA4 in parallel. Cathodes of the photo PD1 to PD4 receive a common voltage VCOMG. The photo diodes PD1 to PD4 generate leakage currents according to sensed lights, and the capacitors CA1 to CA4 respectively receive the leakage currents and generate a plurality of voltages VPD[1] to VPD[4] on anodes of the photo diodes PD1 to PD4.

The light sensor 211 to 214 are respectively coupled to the signal processing circuits 221 to 224 through switches SA1 to SA4. The switches SA1 to SA4 are respectively controlled by control signal GD, and can be turned on or cut off simultaneously according to the control signal GD. If the switches SA1 to SA4 are turned on, the light sensors 211 to 214 may transmit a plurality sensing signals RX[1] to RX[4] according to the voltages VPD[1] to VPD[4] to the signal processing circuits 221 to 224, respectively.

In present embodiment, the signal processing circuit 221 includes an integrating circuit 2211 and a sample and hold circuit 2212. The integrating circuit 2211 includes an operation amplifier OP1, a capacitor CS1, a switch set SS1 and a reset switch SR1. The operation amplifier OP1 has a second input end for receiving the sense signal RX[1], a first input end of the operation amplifier OP1 receive a reference voltage VR[1], and an output end of the operation amplifier OP1 is coupled to the sample and hold circuit 2212. The reset switch SR1 is coupled between the second input end and the output end of the operation amplifier OP1. The reset switch SR1 is configured to be turned on to reset a voltage on the output end of the operation amplifier OP1 to a voltage on the second input end of the operation amplifier OP1. The capacitor CS1 is coupled between the second input end and the output end of the operation amplifier OP1. The switch set SS1 is coupled with the capacitor CS1 in series.

In present embodiment, the integrating circuit 2211 is configured to integrate the sensing signal RX[1], and store an integrating result in the capacitor CS1. The switch set SS1 is configured to couple a first end of the capacitor CS1 to the second input end of the operation amplifier OP1 and couple a second end of the capacitor CS1 to the output end of the operation amplifier OP1, in a first mode. In a second mode, the switch set SS1 may change a connection relationship between the operation amplifier OP1 and the capacitor. The switch set SS1 may be configured to couple the second end of the capacitor CS1 to the second input end of the operation amplifier OP1 and couple the first end of the capacitor CS1 to the output end of the operation amplifier OP1.

When the switch set SS1 is operated in the first mode, the integrating result in the capacitor CS1 with positive voltage can be sent to the corresponding sample and hold circuit 2212. The sample and hold circuit 2212 may sample and hold a signal with a positive voltage on the output end of the integrating circuit 2211 to obtain a processed sensing signal PS1 with a positive polarity. On the other hand, when the switch set SS1 is operated in the second mode, the integrating result in the capacitor CS1 with negative voltage can be sent to the corresponding sample and hold circuit 2212. The sample and hold circuit 2212 may sample and hold a signal with a negative voltage on the output end of the integrating circuit 2211 to obtain the processed sensing signal PS1 with a negative polarity.

The sample and hold circuit 2212 includes a switch S11 and a capacitor CH1. A first end of the switch S11 is coupled to the output end of the integrating circuit 2211, and a second end of the switch S11 is coupled to a first end of the capacitor CH1. A second end of the capacitor CH1 may be coupled to a reference ground end. The first end of the capacitor CH1 may provide the processed sensing signal PS1.

Besides, the signal processing circuit 222 includes an integrating circuit 2221 and a sample and hold circuit 2222; the signal processing circuit 223 includes an integrating circuit 2231 and a sample and hold circuit 2232; and the signal processing circuit 224 includes an integrating circuit 2241 and a sample and hold circuit 2242. The integrating circuits 2221 to 2241 respectively include operation amplifiers OP2 to OP4, reset switch SR2 to SR4 and switch sets SS2 to SS4. The sample and hold circuits 2222 to 2224 respectively include switches S12 to S14 and capacitors CH2 to CH4. The switches S12 to S14 are controlled by a same control signal SHC1. That is, the sample and hold operation performed by the sample and hold circuits 2222 to 2224 can be operated on a same time period.

It should be noted here, circuit structure and operation of each of the signal processing circuits 223 to 224 is same as the signal processing circuit 221. Details of each of the signal processing circuits 223 to 224 can be refer to the details of the signal processing circuit 221 mentioned in above embodiment, and no more repeated description here.

The signal processing circuits 221 to 224 respectively receive the sensing signals RX[1] to RX[4], and generate processed sensing signal PS1 to PS4 according to the sensing signals RX[1] to RX[4]. Furthermore, the signal processing circuits 221 to 224 are respectively coupled to the sensing result generator 230 through a plurality switches SB1 to SB4. The switches SB1 to SB4 are controlled by a control signal SHC2, and can be tuned on or cut off simultaneous according to the control signal SHC2. When the switches SB1 to SB4 are turned on, the processed sensing signals PS1 to PS4 can be transmitted to the sensing result generator 230.

It should be noted here, in present embodiment, one of the processed sensing signals PS1 to PS4 is set to be in the negative polarity, and others of the processed sensing signals PS1 to PS4 are set to be in the positive polarity. Such as that, the sensing result generator 230 may receive the processed sensing signals PS1 to PS4 with different phases. The sensing result generator 230 can generate the OS with improved signal to noise ratio by combining the processed sensing signals PS1 to PS4.

In additional, the sensing result generator 230 may include an analog-to digital converting (ADC) circuit. The ADC circuit is used to convert the output signal OS from analog format to digital format.

Figure 3:
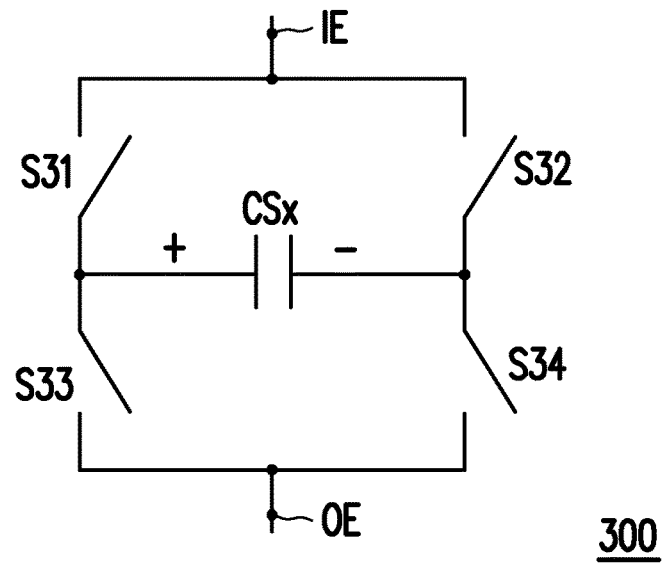
FIG. 3 illustrates a circuit diagram of the switch set according to the embodiment in FIG. 2 of present disclosure.

Please refer to FIG. 3, which illustrates a circuit diagram of the switch set according to the embodiment in FIG. 2 of present disclosure. The switch set 300 may be any one of the switch sets SS1 to SS4 in FIG. 2. The switch set 300 includes switches S31 to S34. The switches S31 to S34 are coupled to a capacitor CSx between a first end IE and a second end OE. The first end IE 5 may one of the second input ends of the operation amplifiers OP1 to OP4, the second end OE may one of the output ends of the operation amplifiers OP1 to OP4 in FIG. 2. The capacitor CSx is any one of the capacitors CS1 to CS4 in FIG. 2.

In detail, the switch S31 is coupled between the first end IE and a first end of the capacitor CSx; the switch S32 is coupled between the first end IE and a second end of the capacitor CSx; the switch S33 is coupled between the second end OE and the first end of the capacitor CSx; and the switch S34 is coupled between the second end OE and the second end of the capacitor CSx. In this embodiment, the first end of the capacitor CSx may be a positive end, and the second end of the capacitor CSx may be a negative end of the capacitor CSx.

In detail of operation of the switch set 300, turned on or cut off statuses of the switch S31 and the switch S32 are different, turned on or cut off statuses of the switch S33 and the switch S34 are different, the turned on or cut off statuses of the switch S31 and the switch S34 are same, and the turned on or cut off statuses of the switch S32 and the switch S33 are same. That is, when both the switches S31 and S33 are turned on, the switches S32 and S34 are cut off, and the first end of the capacitor CSx is coupled to the first end IE, and the second end of the capacitor CSx is coupled to the second end OE. On the other hand, when both the switches S31 and S33 are cut off, the switches S32 and S34 are turned off, and the first end of the capacitor CSx is coupled to the second end OE, and the second end of the capacitor CSx is coupled to the first end IE.

It can be seen, by changing the on off statuses of the switches S31 to S34, a connection relationship between the capacitor CSx and the first end IE and the second end OE can be reversed and the polarity of the signal provided by integrating circuit can be changed.

Figure 4:
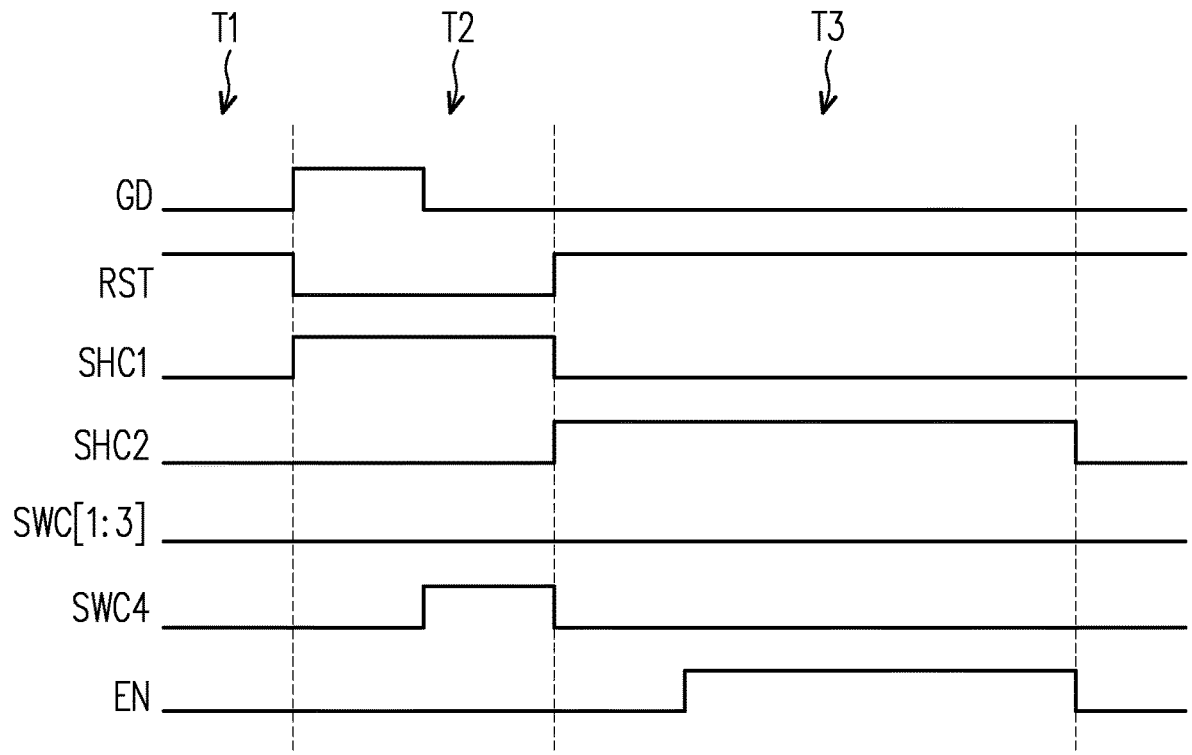
FIG. 4 illustrates a waveform plot of the fingerprint recognition driving device according to the embodiment of FIG. 2 of present disclosure.

Please refer to FIG. 2 and FIG. 4 commonly, wherein FIG. 4 illustrates a waveform plot of the fingerprint recognition driving device according to the embodiment of FIG. 2 of present disclosure. In FIG. 4, during a time period T1 (an exposing time period), a reset signal RST for controlling the reset switches SR1 to SR4 are enabled to reset the integrating circuits 2211 to 2214. The photo diodes PD1 to PD4 sense lights reflected by a fingerprint of a user, and generate leakage current to charge to capacitors CA1 to CA4. During a time period T2 (a sampling time period), the control signal GD is enabled to turn on the switches SA1 to SA4. The light sensors 211 to 214 respectively provides the sensing signals RX[1] to RX[4] according to the voltages VPD[1] to VPD[4] to the integrating circuits 2211 to 2214. Furthermore, during the time period T2, the control signal SHC1 is enabled to activate the sample and hold circuits 2212 to 2242. It should be noted here, a control signal SWC4 for controlling the switch set SS4 is enabled to adjust a polarity of the corresponding processed sensing signal PS4 to the negative polarity. Control signals SWC[1:3] for controlling the switch sets SS1 to SS3 are not enabled, and the polarity of the corresponding processed sensing signals PS1 to PS3 are kept on the positive polarity. The control signal SWC4 is enabled after the control signal GD is disabled during the time period T2.

During a time period T3 (a capturing time period), the control signal SHC2 are enabled, and the switches SB1 to SB4 are turned on to transmit the processed sensing signals PS1 to PS4 to the sensing result generator 230. An enable signal EN for activate the sensing result generator 230 is also enabled during the time period T3. Correspondingly, the sensing result generator 230 can combine the processed sensing signals PS1 to PS4 during the time period T3 to generate the output signal OS.

Figure 5:
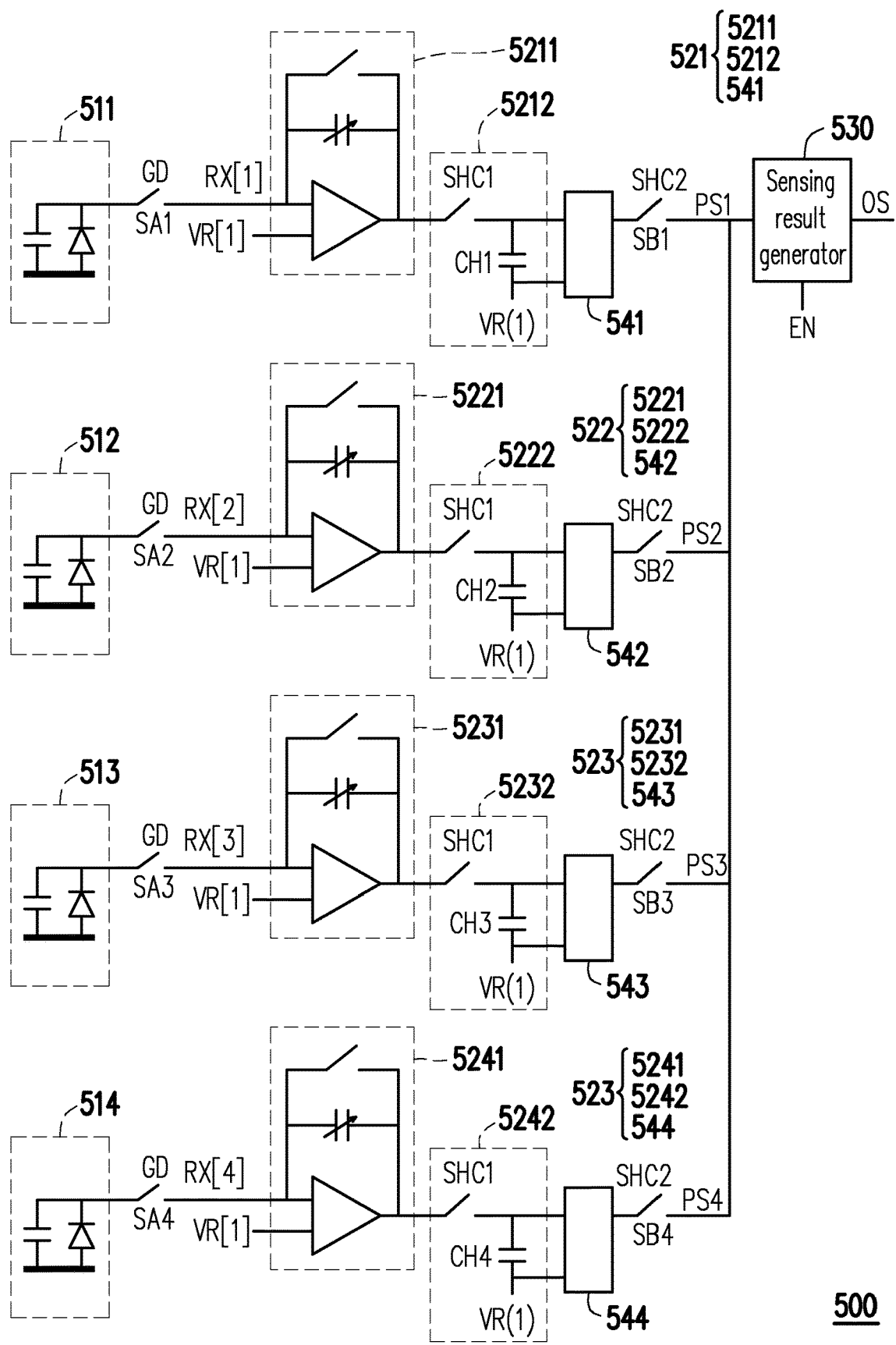
FIG. 5 illustrates a schematic diagram of a fingerprint recognition driving device according to another embodiment of present disclosure.

Please refer to FIG. 5, which illustrates a schematic diagram of a fingerprint recognition driving device according to another embodiment of present disclosure. The fingerprint recognition driving device 500 includes a plurality of light sensor 511 to 514, a plurality of signal processing circuits 521 to 524 and a sensing result generator 530. The light sensor 511 to 514 are respectively coupled to the signal processing circuits 521 to 524 through switches SA1 to SA4. The switches SA1 to SA4 are controlled by a same control signal GD. The signal processing circuit 521 includes an integrating circuit 5211, a sample and hold circuit 5221 and a switch set 541; the signal processing circuit 522 includes an integrating circuit 5212, a sample and hold circuit 5222 and a switch set 542; the signal processing circuit 523 includes an integrating circuit 5213, a sample and hold circuit 5223 and a switch set 543; the signal processing circuit 524 includes an integrating circuit 5214, a sample and hold circuit 5224 and a switch set 544.

The sample and hold circuits 5221 to 5224 are controlled by a same control signal SHC1 for performing sample and hold operations. The capacitors CH1 to CH4 in the sample and hold circuits 5221 to 5224 are respectively coupled to the switch sets 541 to 544. Each of the switch set 541 to 544 is used to adjust a connection relationship between each of the capacitors CH1 to CH4, a reference voltage VR[1] and the each of the switches SB1 to SB4. In here, circuitry structure of each of switch sets 541 to 544 can be refer to the embodiment of FIG. 3.

Figure 6:
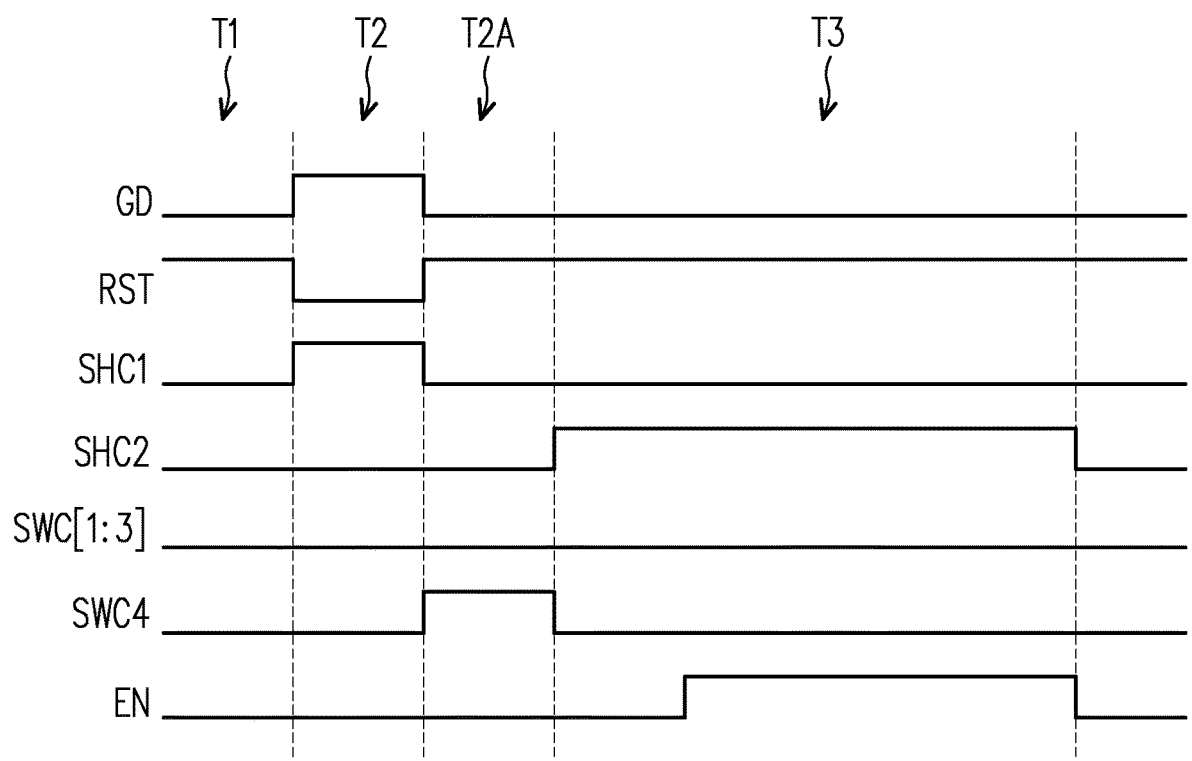
FIG. 6 illustrates a waveform plot of the fingerprint recognition driving device according to the embodiment of FIG. 5 of present disclosure.

Please refer to FIG. 5 and FIG. 6 commonly, wherein FIG. 6 illustrates a waveform plot of the fingerprint recognition driving device according to the embodiment of FIG. 5 of present disclosure. In FIG. 6, during a time period T1 (an exposing time period), a reset signal RST for controlling the reset switches SR1 to SR4 is enabled to reset the integrating circuits 2211 to 2214. Photo diodes of the light sensors 511 to 514 sense lights reflected by a fingerprint of a user, and generate leakage current to charge to capacitors of the light sensors 511 to 514. During a time period T2 (a sampling time period), the control signal GD is enabled to turn on the switches SA1 to SA4. The light sensors 511 to 514 respectively provide the sensing signals RX[1] to RX[4] to the integrating circuits 5211 to 5214. Moreover, the control signal SHC1 is enabled to activate the sample and hold circuits 5212 to 5242. During the time period T2A (an inverting time period), a control signal SWC4 for controlling the switch set 544 is enabled to adjust a polarity of the corresponding processed sensing signal PS4 to the negative polarity. Control signals SWC[1:3] for controlling the switch sets 541 to 543 are not enabled, and the polarity of the corresponding processed sensing signals PS1 to PS3 are kept on the positive polarity.

During a time period T3 (a capturing time period), the control signal SHC2 are enabled, and the switches SB1 to SB4 are turned on to transmit the processed sensing signals PS1 to PS4 to the sensing result generator 530. An enable signal EN for activate the sensing result generator 530 is also enabled during the time period T3. Correspondingly, the sensing result generator 530 combined the processed sensing signals PS1 to PS4 during the time period T3, and the output signal OS can be obtained.

Figure 7:
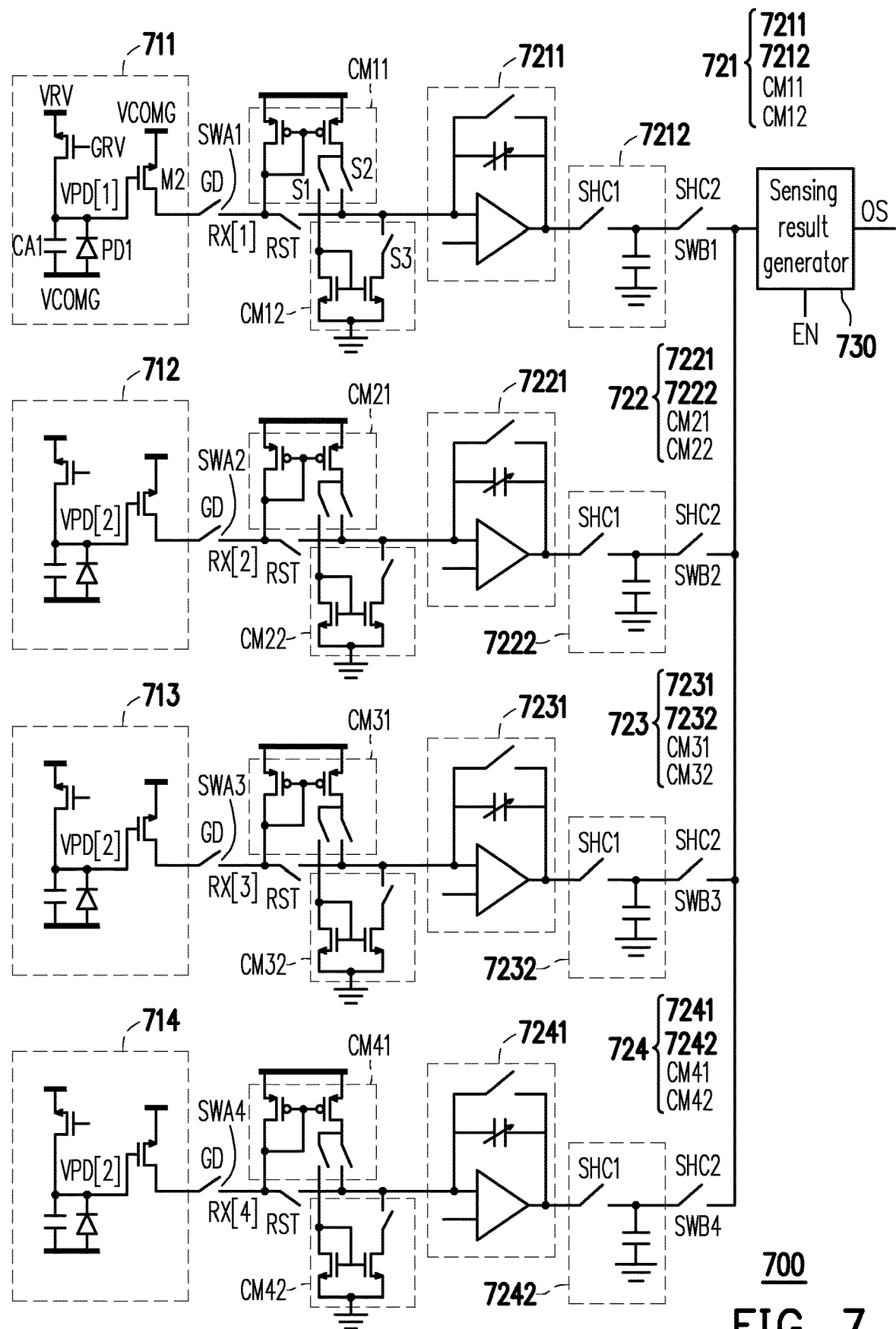
FIG. 7 illustrates a schematic diagram of a fingerprint recognition driving device according to another embodiment of present disclosure.

Please refer to FIG. 7, which illustrates a schematic diagram of a fingerprint recognition driving device according to another embodiment of present disclosure. The fingerprint recognition driving device 700 includes a plurality of light sensor 711 to 714, a plurality of signal processing circuits 721 to 724 and a sensing result generator 730. The light sensor 711 to 714 are respectively coupled to the signal processing circuits 721 to 724 through switches SA1 to SA4.

Take the light sensor 711 as an example. The light sensor 711 includes a photo diode PD1, a capacitor CA1 and transistors M1 and M2. The photo diode PD1 and the capacitor CA1 are coupled in parallel between a power voltage VRV and a common voltage VCOMG. The transistor M1 is coupled between the capacitor CA1 and the power voltage VRV, and is controlled by a signal GRV. The transistor M2 is configured to be an amplifier, and receives a voltage VPD[1] on an anode of the photo diode PD1, and generate a sensing signal RX[1] according to the voltage VPD[1] based on a common voltage VCOMP.

Each of the light sensors 712 to 714 has same circuitry structure with the light sensor 711, and no more repeated description here. In here, the light sensors 712 to 714 provide sensing signals RX[2] to RX[4] according voltages VPD[2] to VPD[4] generated based on sensed lights, respectively.

On the other hand, the signal processing circuit 721 includes current mirrors CM11, CM12, a integrating circuit 7211 and a sample and hold circuit 7212; the signal processing circuit 722 includes current mirrors CM21, CM22, a integrating circuit 7221 and a sample and hold circuit 7222; the signal processing circuit 723 includes current mirrors CM31, CM32, a integrating circuit 7231 and a sample and hold circuit 7232; the signal processing circuit 724 includes current mirrors CM41, CM42, a integrating circuit 7241 and a sample and hold circuit 7242.

Take the signal processing circuit 721 as an example. There are switches S1 to S3 are disposed between the first current mirror CM11, the second current mirror CM12 and the input end of the integrating circuit 7211. The switch S1 is coupled between the first current mirror CM11 and the second current mirror CM12. The switch S2 is couple between the first current mirror CM11 and the input end of the integrating circuit 7211. The switch S3 is coupled between the second current mirror CM12 and the input end of the integrating circuit 7211.

If the switch S1 is turned on, the switch S3 is turned on and the switch S2 is cut off correspondingly. At this manner (a first manner), the first current mirror CM1 is coupled to the second current mirror CM2, the first current mirror CM1 is isolated from the input end of the integrating circuit 7211, and the second current mirror CM1 is coupled to the input end of the integrating circuit 7211. If the switch S1 is cut off, the switch S3 is cut off and the switch S2 is turned on correspondingly. At this manner (a second manner), the first current mirror CM1 is isolated from the second current mirror CM2, the first current mirror CM1 is coupled to the input end of the integrating circuit 7211, and the second current mirror CM1 is isolated from the input end of the integrating circuit 7211.

The current mirror CM11 receives the sensing signal RX[1] and mirror the sensing signal RX[1] to generate a first mirror signal. At the first manner, the first mirror signal may be transmitted to the second current mirror CM2, and the second current mirror CM2 may generate a second mirror signal on the input end of the integrating circuit 7211 according to the first mirror signal. Such as that, a polarity the processed sensing signal PS1 generated by the signal processing circuit 721 can be set to a negative polarity.

On the other hand, at the second manner, the first mirror signal may be transmitted to the input end of the integrating circuit 7211, and the second current mirror CM2 is isolated from the first current mirror CM1 and is disabled. Such as that, a polarity the processed sensing signal PS1 generated by the signal processing circuit 721 can be set to a positive polarity.

The integrating circuit 7211 and the sample and hold circuit 7212 may be implemented by any integrating circuit and sample and hold circuit well known by a person skilled in this art, and no more special limitation here.

Each of the signal processing circuits 722 to 724 has same circuitry structure with the signal processing circuit 721, and no more repeated description here.

The sensing result generator 730 can be activated by an enable signal EN when the switches SWB1 to SWB4 is turned on according to a control signal SHC2. The sensing result generator 730 is used to receive the processed sensing signals PS1 to PS4 with different phases to generate an output signal OS.

Figure 8:
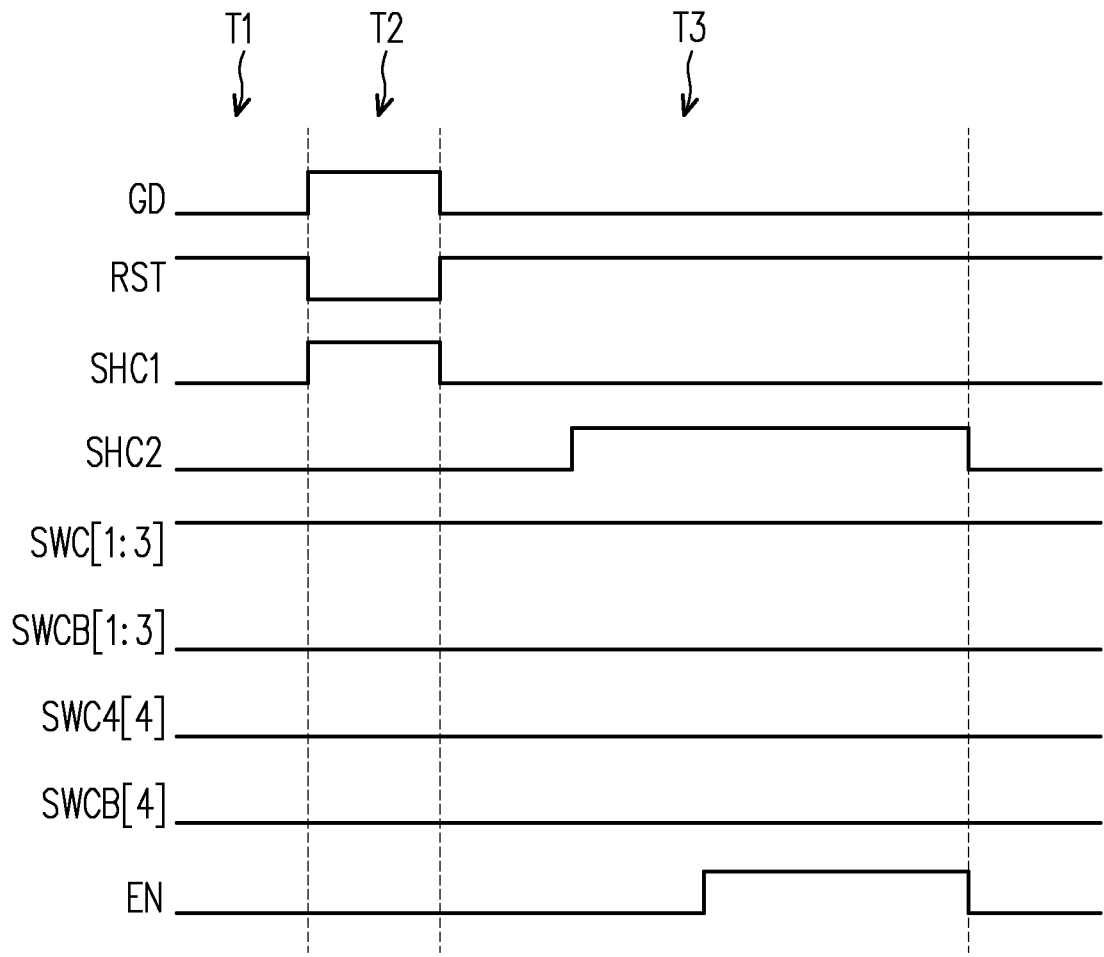
FIG. 8 illustrates a waveform plot of the fingerprint recognition driving device according to the embodiment of FIG. 7 of present disclosure.

Please refer to FIG. 7 and FIG. 8 commonly, wherein FIG. 8 illustrates a waveform plot of the fingerprint recognition driving device according to the embodiment of FIG. 7 of present disclosure. In FIG. 8, during a time period T1 (an exposing time period), a reset signal RST for controlling the reset switches is enabled to reset the integrating circuits 7211 to 7214 and the first current mirrors CM11 to CM14 and the second current mirrors CM21 to CM24. Photo diodes of the light sensors 711 to 714 sense lights reflected by a fingerprint of a user, and generate leakage current to charge to capacitors of the light sensors 711 to 714 to generate the sensing signals RX[1] to RX[4].

During a time period T2 (a sampling time period), the control signal GD is enabled to turn on the switches SA1 to SA4. The light sensors 711 to 714 respectively provide the sensing signals RX[1] to RX[4] to the first current mirrors CM11 to CM41. During the time period T2, control signals SWC[1:3] for controlling the switches S2 of the first current mirrors CM11 to CM31 are enabled; control signals SWCB[1:3] for controlling the switches S1 and S2 of the first current mirrors CM11 to CM31 are disabled; control signal SWC[4] for controlling the switch S2 of the first current mirrors CM4 is disabled; and control signal SWCB[4] for controlling the switches S1 and S2 of the first current mirrors CM4 are enabled. Such as that, the integrating circuits 7211 to 7231 receive the first mirror signals from the first current mirrors CM11 to CM31, respectively. The integrating circuit 7241 receives the second mirror signal from the second current mirror CM42. That is, the processed sensing signals PS1 to PS3 may have the positive polarity, and the processed sensing signal PS4 may have the negative polarity.

During a time period T3 (a capturing time period), the control signal SHC2 are enabled, and the switches SB1 to SB4 are turned on to transmit the processed sensing signals PS1 to PS4 to the sensing result generator 730. An enable signal EN for activate the sensing result generator 730 is also enabled during the time period T3. Correspondingly, the sensing result generator 730 combine the processed sensing signals PS1 to PS4 during the time period T3, and the output signal OS can be obtained.

Figure 9:
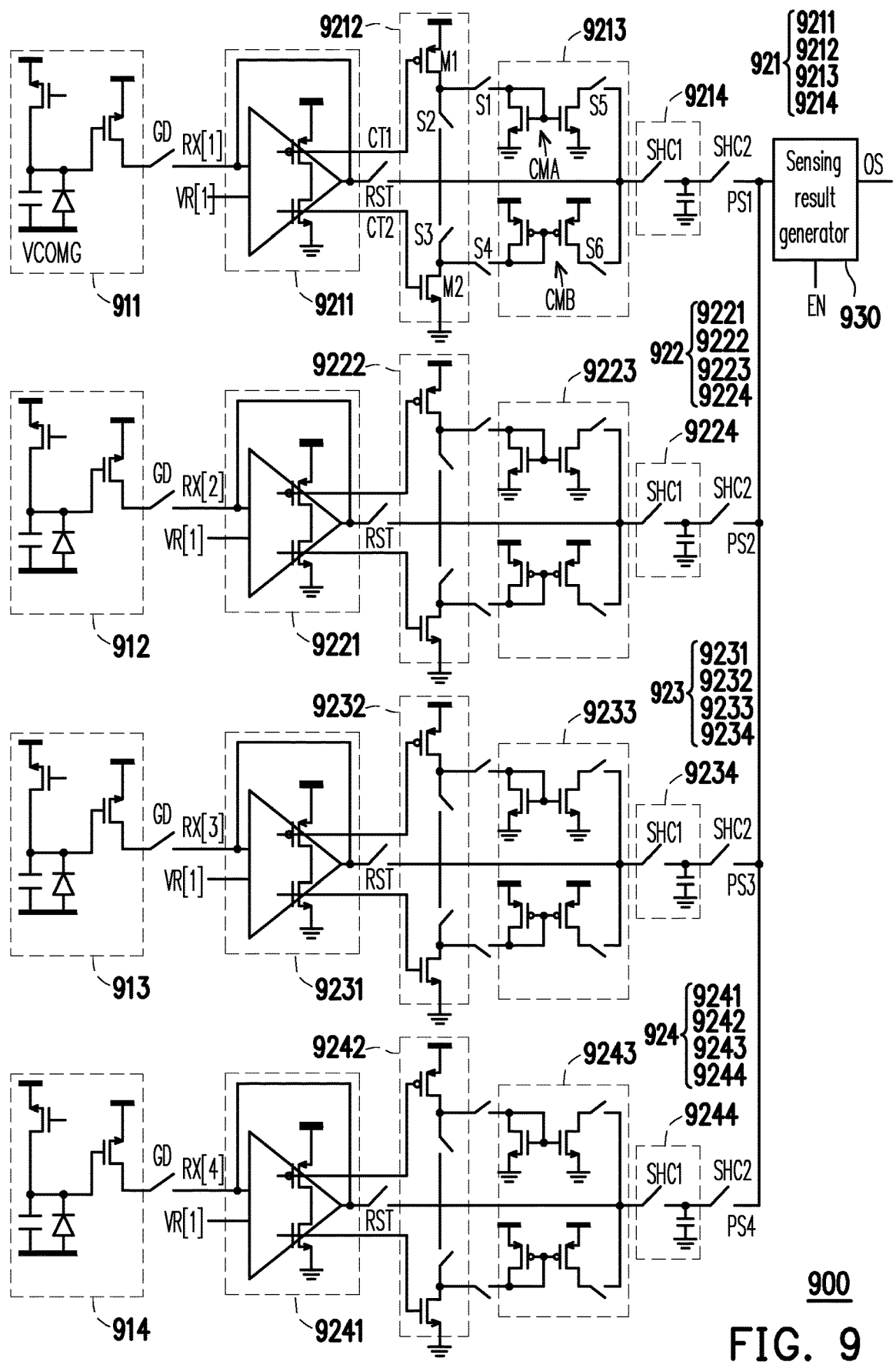
FIG. 9 illustrates a schematic diagram of a fingerprint recognition driving device according to another embodiment of present disclosure.

Please refer to FIG. 9, which illustrates a schematic diagram of a fingerprint recognition driving device according to another embodiment of present disclosure. The fingerprint recognition driving device 900 includes a plurality of light sensor 911 to 914, a plurality of signal processing circuits 921 to 924 and a sensing result generator 930. The light sensor 911 to 914 are respectively coupled to the signal processing circuits 921 to 924 through switches SA1 to SA4.

Each of the light sensor 911 to 914 may have same circuitry structure with each of the light sensor 711 to 714, and no more repeated description here. The light sensor 911 to 914 respectively generate sensing signals RX[1] to RX[4].

On the other hand, the signal processing circuit 921 includes a buffer 9211, a driving circuit 9212, a current mirror set 9213 and a sample and hold circuit 9214; the signal processing circuit 922 includes a buffer 9221, a driving circuit 9222, a current mirror set 9223 and a sample and hold circuit 9224; the signal processing circuit 923 includes a buffer 9231, a driving circuit 9232, a current mirror set 9233 and a sample and hold circuit 9234; and the signal processing circuit 924 includes a buffer 9241, a driving circuit 9242, a current mirror set 9243 and a sample and hold circuit 9244.

Take the signal processing circuit 921 as an example. The buffer 9211 may be implemented by an operation amplifier. The operation amplifier may receive the sensing signal RX[1] by a first input end, and receive a reference voltage VR[1] by a second input end. The buffer 9211 may have differential output ends for providing a first control signal CT1 and a second control signal CT2. The driving circuit 9212 includes transistors M1 and M2, where the transistor M1 may be a P-type transistor and the transistor M2 may be a N-type transistor. The transistors M1 and M2 are coupled in series between a power voltage and a reference ground end. The transistors M1 and M2 are respectively controlled by the first control signal CT1 and the second control signal CT2 to generate a driving signal.

There are switches S2 and S3 to from a switch set, and switches S1, S4, S5 and S6 to form another switch set. The switches S2 and S3 are coupled between the transistors M1 and M2 and an output end of the fingerprint recognition driving device 900. Both of the switches S2 and S3 are turned on or cut off simultaneously. If the switches S2 and S3 are turned on, the driving circuit 9212 may generate a driving signal to an input end of the sample and hold circuit 9214. In present embodiment, when the switches S2 and S3 are turned on, the switches S1, S4 to S6 are cut off.

On the other hand, if the switches S2 and S3 are cut off, the switches S1, S4 to S6 are turned on. The transistor M1 may be coupled to a first current mirror CMA of the current mirror set 9213, the transistor M2 may be coupled to second current mirror CMB of the current mirror set 9213, and the first current mirror CMA and the second current mirror CMB are coupled to the input end of the sample and hold circuit 9214. The current mirror set 9213 may convert the driving signal generated by the driving circuit 9212 to generate a converted driving signal to the input end of the sample and hold circuit 9214.

In present embodiment, the first current mirror CMA is implemented by two N-type transistors, and the second current mirror CMB is implemented by two P-type transistors.

Each of the sample and hold circuits 9214 to 9244 may have same circuitry structure with each of the sample and hold circuits 7214 to 7244, and no more repeated description here. The sample and hold circuits 9214 to 9244 respectively generate the processed sensing signals PS1 to PS4.

The processed sensing signals PS1 to PS4 may be transmitted to the sensing signal generator 930 when switches SB1 to SB4 are turned on according to the control signal SHC2. The sensing result generator 930 can be activated by an enable signal EN when the switches SWB1 to SWB4 is turned on according to a control signal SHC2. The sensing result generator 930 is used to receive the processed sensing signals PS1 to PS4 with different phases to generate an output signal OS.

Figure 10:
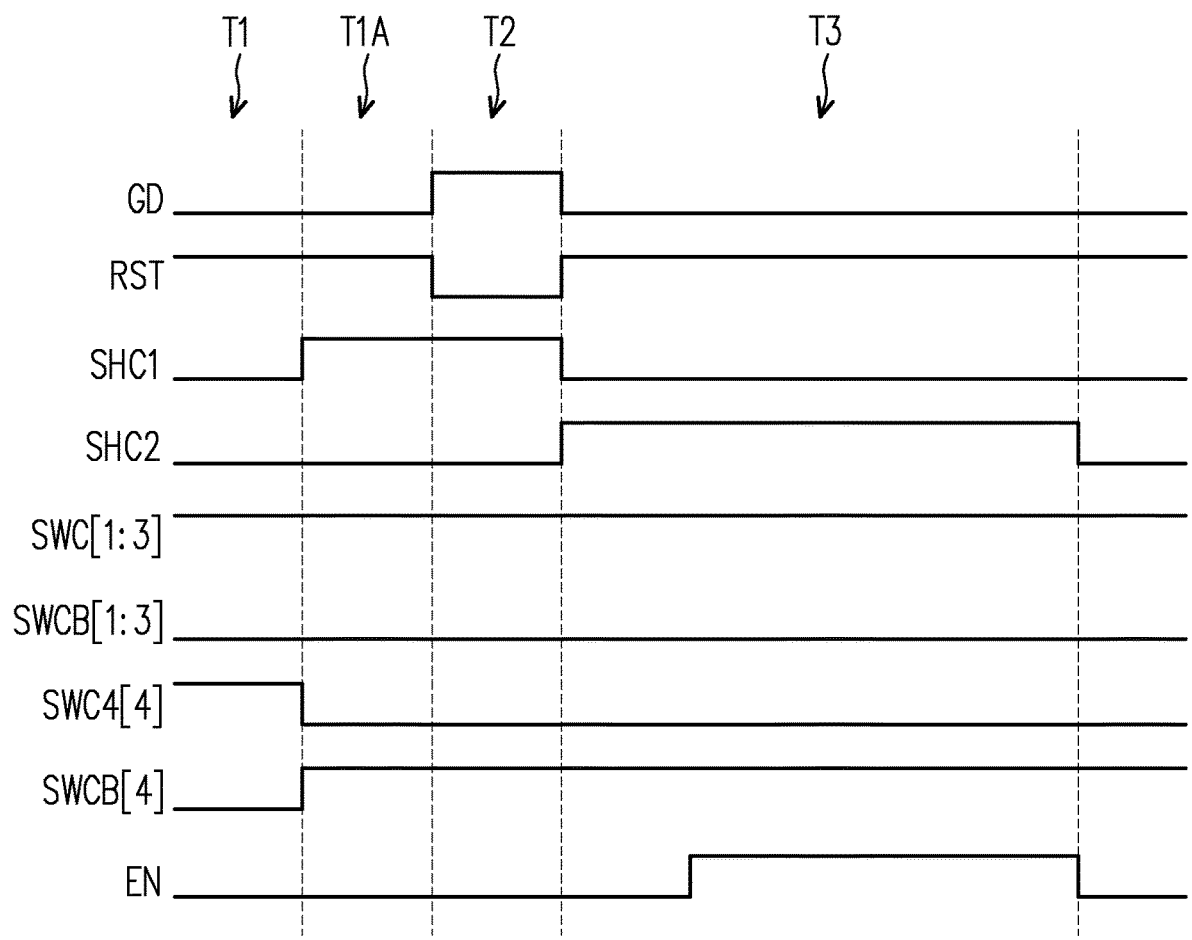
FIG. 10 illustrates a waveform plot of the fingerprint recognition driving device according to the embodiment of FIG. 9 of present disclosure.

Please refer to FIG. 9 and FIG. 10 commonly, wherein FIG. 10 illustrates a waveform plot of the fingerprint recognition driving device according to the embodiment of FIG. 9 of present disclosure. In FIG. 10, during a time period T1 (an exposing time period), photo diodes of the light sensors 911 to 914 sense lights reflected by a fingerprint of a user, and generate leakage current to charge to capacitors of the light sensors 911 to 914 to generate the sensing signals RX[1] to RX[4]. During a time period T1A (a resetting time period), a reset signal RST for controlling the reset switches is enabled and the output ends of the buffer 9211 to 9241 are respectively coupled to the input ends of the sample and hold circuits 9214 to 9244. At the same time period, control signal SHC1 is enabled and the signals on the output ends of the buffer 9211 to 9241 may be respectively sampled by the sample and hold circuits 9214 to 9244.

On the other hand, during the time period T1A, control signal SWC[1:3] for controlling the switches S2 and S3 of each of the signal processing circuits 921 to 923 are enabled, and the switches S2 and S3 of each of the signal processing circuits 921 to 923 are turned on. Control signal SWCB[1:3] for controlling the switches S1 and S4 to S6 of each of the signal processing circuits 921 to 923 are disabled, and the switches S1 and S4 to S6 of each of the signal processing circuits 921 to 923 are cut off. Furthermore, control signal SWC4 for controlling the switches S2 and S3 of the signal processing circuit 924 is disabled, and the switches S2 and S3 of each of the signal processing circuit 924 are cut off. Control signal SWCB4 for controlling the switches S1 and S4 to S6 of the signal processing circuit 924 is enabled, and the switches S1 and S4 to S6 of the signal processing circuit 924 are turned on.

During a time period T2 (a sampling time period), the reset signal RST is disabled and the control signal GD is enabled, and the processed sensing signal PS4 may have a negative polarity and the processed sensing signals PS1 to PS3 may have a positive polarity, and the processed sensing signals PS1 to PS4 may be respectively sampled by the sample and hold circuits 9214 to 9244.

During a time period T3 (a capturing time period), the control signal SHC2 are enabled, and the switches SB1 to SB4 are turned on to transmit the processed sensing signals PS1 to PS4 to the sensing result generator 930. An enable signal EN for activate the sensing result generator 930 is also enabled during the time period T3. Correspondingly, the sensing result generator 730 combines the processed sensing signals PS1 to PS4 during the time period T3, and the output signal OS can be obtained.

Figure 11A:
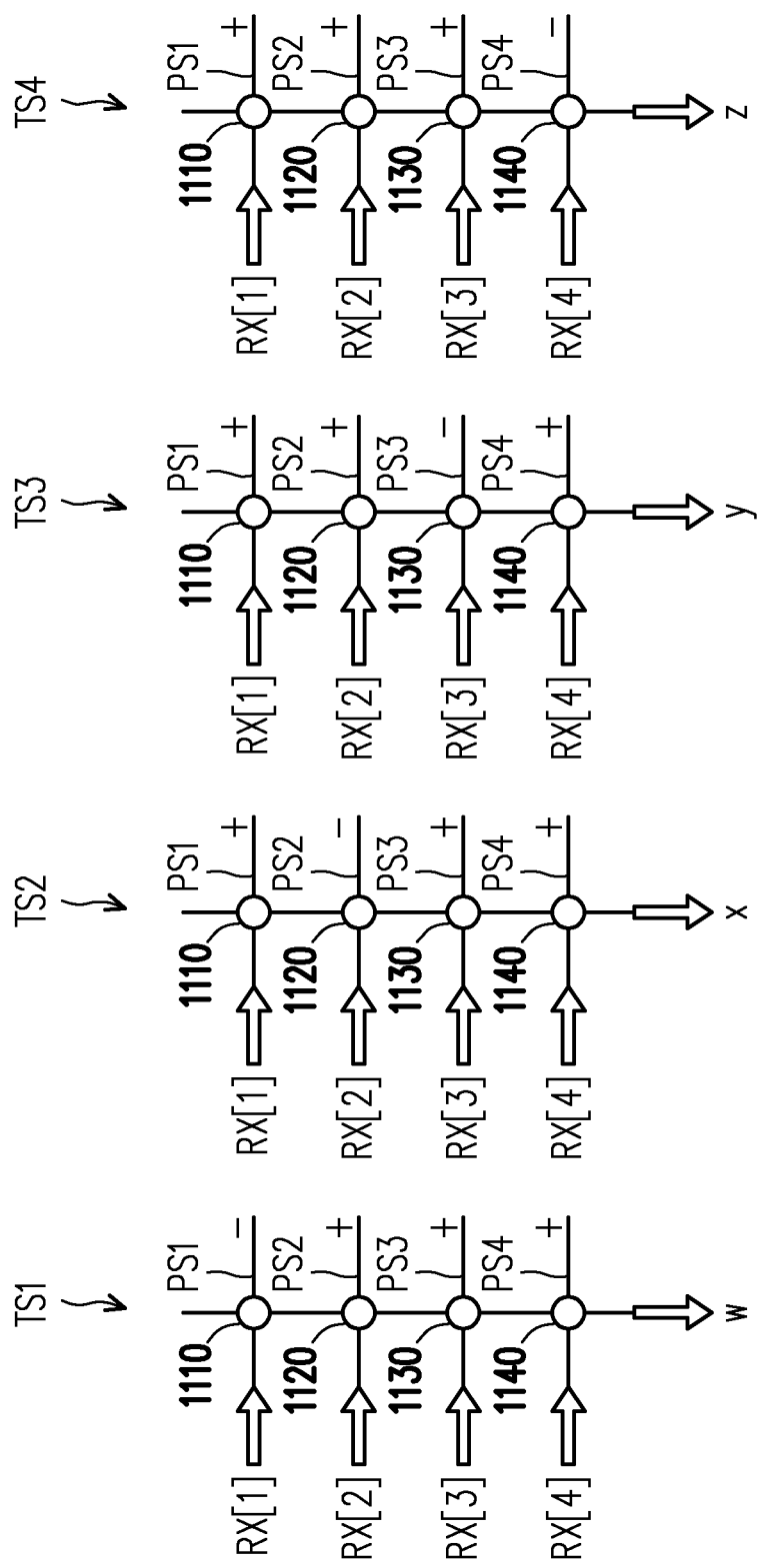
FIG. 11A to FIG. 11C illustrates schematic diagrams of an array algorithm performed by a sensing result generator according to embodiments of present disclosure.
Figure 11B:
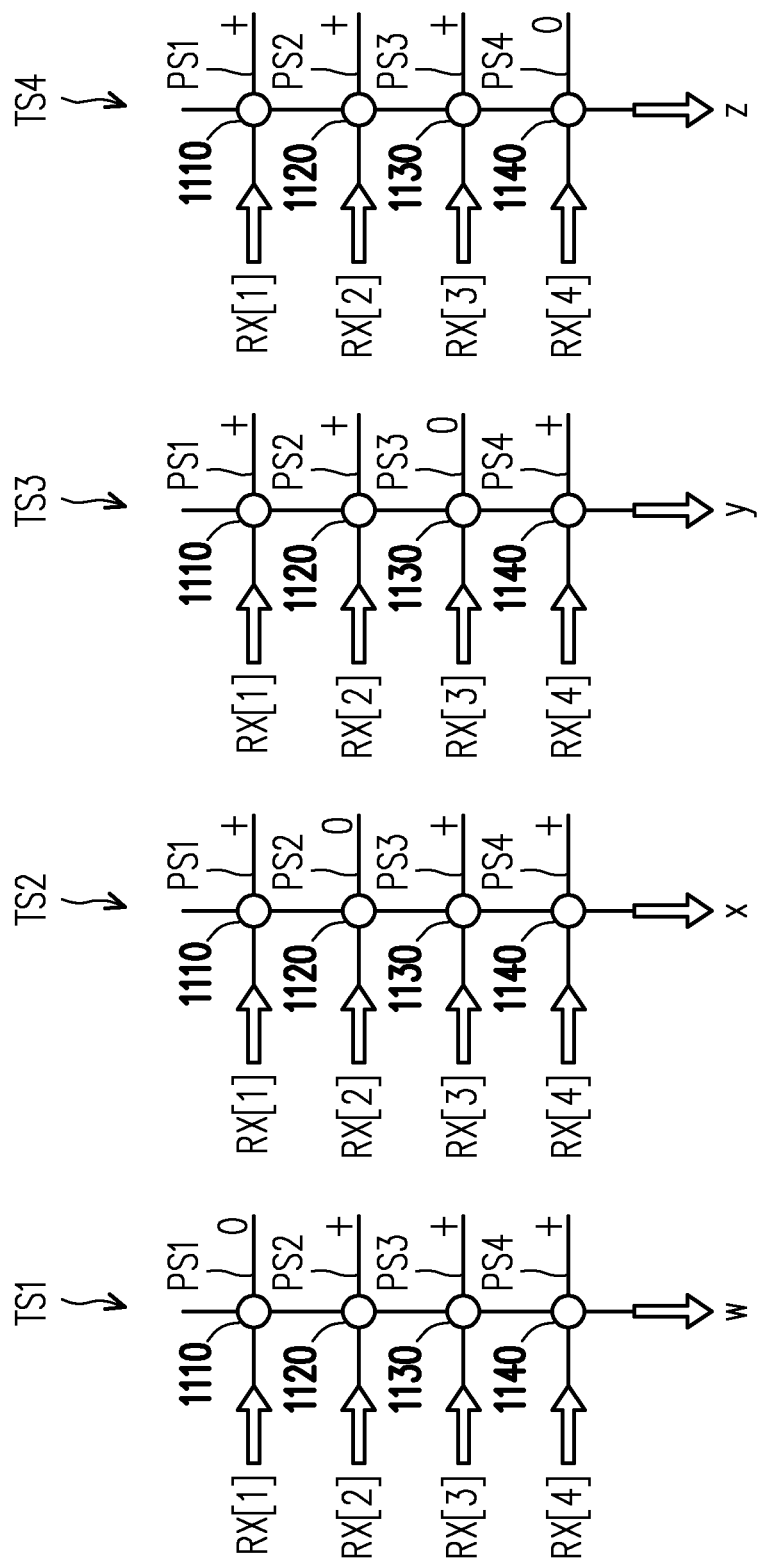
Figure 11C:
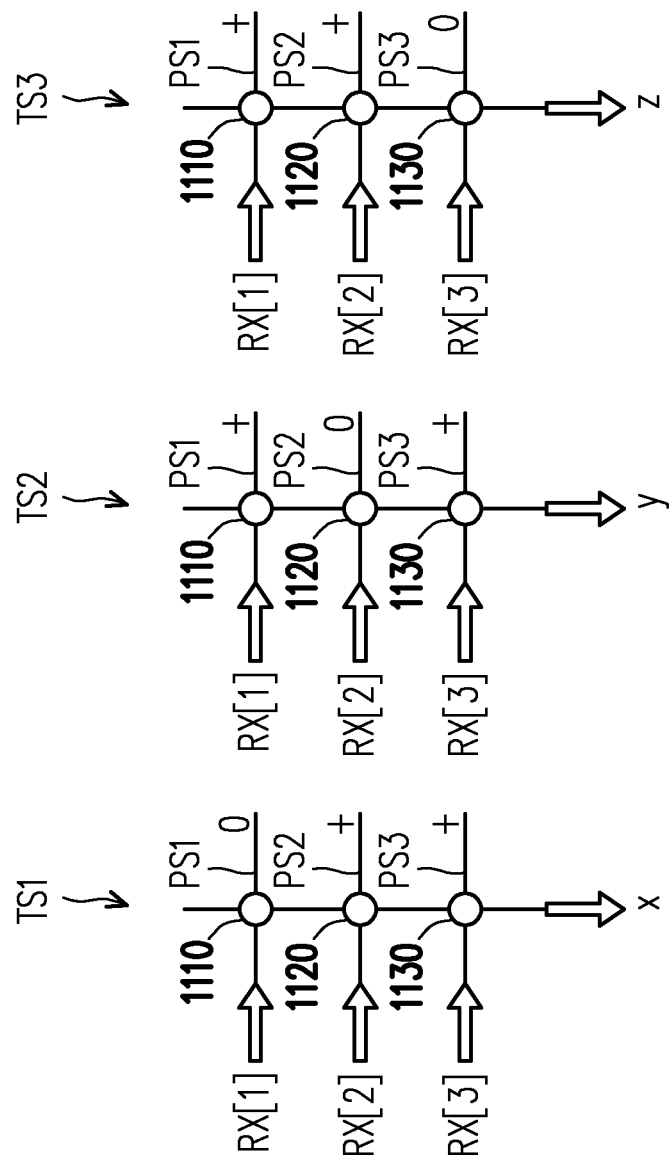

Please refer to FIG. 11A to FIG. 11C, which illustrates schematic diagrams of an array algorithm performed by a sensing result generator according to embodiments of present disclosure. In FIG. 11A, sensing signals RX[1] to RX[4] are transmitted to a plurality of signal processing circuits 1110 to 1140. The signal processing circuits 1110 to 1140 respectively process the sensing signals RX[1] to RX[4] and obtain processed sensing signals PS1 to PS4, respectively. During a sensing period TS1, the processed sensing signal PS1 is the negative polarity and the processed sensing signals PS2 to PS4 are the positive polarity; during a sensing period TS2, the processed sensing signal PS2 is the negative polarity and the processed sensing signals PS1, PS3 and PS4 are the positive polarity; during a sensing period TS3, the processed sensing signal PS3 is the negative polarity and the processed sensing signals PS1, PS2 and PS4 are the positive polarity; during a sensing period TS4, the processed sensing signal PS4 is the negative polarity and the processed sensing signals PS2, to PS4 are the positive polarity.

By combing the processed sensing signals PS1 to PS4 during the sensing period TS1 to TS4, values of output signal of the sensing result generator corresponding to the sensing period TS1 to TS4 may be w, x, y, z, respectively. Relationship between the processed sensing signals PS1 to PS4 and the values w, x, y, z of the output signal may be represented by an array operation shown as below:

$$\begin{bmatrix} -+++ \\ +-++ \\ ++-+ \\ +++- \end{bmatrix} \begin{bmatrix} PS1 \\ PS2 \\ PS3 \\ PS4 \end{bmatrix} = \begin{bmatrix} w \\ x \\ y \\ z \end{bmatrix}$$

Such as that, simultaneous equations can be obtained as below:

$$\begin{cases} PS1 = \frac{1}{4}(-w + x + y + z) \\ PS2 = \frac{1}{4}(w - x + y + z) \\ PS3 = \frac{1}{4}(w + x + y + z) \\ PS4 = \frac{1}{4}(w + x + y - z) \end{cases}$$

The sensing result generator may solve the simultaneous equations shown above, and each of the processed sensing signals PS1 to PS4 can be obtained by the sensing result generator. Such as that, a fingerprint of a user can be identified.

In FIG. 11B, the sensing result generator may further multiply one of the processed signals PS1 to PS4 which is the negative polarity with 0. The array operation shown as below:

$$\begin{bmatrix} 0+++ \\ +0++ \\ ++0+ \\ +++0 \end{bmatrix} \begin{bmatrix} PS1 \\ PS2 \\ PS3 \\ PS4 \end{bmatrix} = \begin{bmatrix} w \\ x \\ y \\ z \end{bmatrix}$$

Such as that, the simultaneous equations can be obtained as below:

$$\begin{cases} PS1 = \frac{1}{3}(-2w + x + y + z) \\ PS2 = \frac{1}{3}(w - 2x + y + z) \\ PS3 = \frac{1}{3}(w + x - 2y + z) \\ PS4 = \frac{1}{3}(w + x + y - 2z) \end{cases}$$

The sensing result generator may solve the simultaneous equations shown above, and each of the processed sensing signals PS1 to PS4 can be obtained by the sensing result generator. Such as that, a fingerprint of a user can be identified.

In FIG. 11C, number of the light sensors and the signal processing circuits can be set to 3. In this embodiment, the array operation shown as below:

$$\begin{bmatrix} 0++ \\ +0+ \\ ++0 \end{bmatrix} \begin{bmatrix} PS1 \\ PS2 \\ PS3 \end{bmatrix} = \begin{bmatrix} x \\ y \\ z \end{bmatrix}$$

Such as that, the simultaneous equations can be obtained as below:

$$\begin{cases} PS1 = \frac{1}{2}(-x + y + z) \\ PS2 = \frac{1}{2}(x - y + z) \\ PS3 = \frac{1}{2}(x + y - z) \end{cases}$$

The sensing result generator may solve the simultaneous equations shown above, and each of the processed sensing signals PS1 to PS3 can be obtained by the sensing result generator. Such as that, a fingerprint of a user can be identified.

In some embodiments, the numbers of the light sensors and the signal processing circuits in the fingerprint recognition driving device may be 5 or larger, and no special limitation here. A designer may set the number of the light sensors and the signal processing circuits in the fingerprint recognition driving device according to practical necessary.

In summary, the fingerprint recognition driving device includes a plurality of signal processing circuits for processing a plurality of sensing signals. The signal processing circuits, during each of a plurality of sensing periods, generates one processed signal having different polarity with others processed signals, and generates an output signal by combining the processed sensing signals. Furthermore, the sensing result generator may perform an operation on the output signals during the sensing periods according to an array algorithm to obtain each of the processed sensing signals. Such as that, a sensing result can be obtained.

What is claimed is:
1. A fingerprint recognition driving device, comprises:
   a plurality of light sensors, for generating a plurality of sensing signals; and
   a plurality of signal processing circuits, respectively coupled to the light sensors, for processing the sensing signals to generate a plurality of processed sensing signals, wherein, during each of a plurality of sensing periods, one of the signal processing circuits provides corresponding processed sensing signal with a first polarity, and each of the other signal processing circuits provides corresponding processed sensing signals with a second polarity, and the first polarity is different from the second polarity, the signal processing circuits generates an output signal according to the processed sensing signals.

2. The fingerprint recognition driving device according to claim 1, wherein each of the signal processing circuits comprises:

an integrating circuit, comprises:
  an operation amplifier, having a first end for receiving a reference voltage;
  a capacitor;
  a switch set, coupled between a second input end of the operation amplifier and an output of the operation amplifier, wherein the switch set couples a first end of the capacitor to the second input end of the operation amplifier and couples a second end of the capacitor to the output of the operation amplifier in a first mode, and the switch set couples the second end of the capacitor to the second input end of the operation amplifier and couples the first end of the capacitor to the output end of the operation amplifier in a second mode; and a sample and hold circuit, coupled to the output end of the operation amplifier, wherein each of the sample and hold circuits samples and holds a signal on the output end of the operation amplifier to obtain the corresponding processed sensing signal.

3. The fingerprint recognition driving device according to claim 2, wherein the switch set comprises:

a first switch, coupled between the second input end of the operation amplifier and the first end of the capacitor;

a second switch, coupled between the second input end of the operation amplifier and the second end of the capacitor;

a third switch, coupled between the output end of the operation amplifier and the first end of the capacitor; and a fourth switch, coupled between the output end of the operation amplifier and the second end of the capacitor.

4. The fingerprint recognition driving device according to claim 3, wherein turned on or cut off statuses of the first switch and the second switch are different, turned on or cut off statuses of the third switch and the fourth switch are different, the turned on or cut off statuses of the first switch and the fourth switch are same, and the turned on or cut off statuses of the second switch and the third switch are same.

5. The fingerprint recognition driving device according to claim 1, wherein each of the signal processing circuits comprises:

an integrating circuit, integrating the corresponding sensing signal and generating the corresponding processed sensing signal; and a sample and hold circuit, comprises:
  a first switch, having a first end coupled to an output end of the integrating circuit; and
  a capacitor, having a first end coupled to a second end of the first switch, a second end of the capacitor receiving a reference voltage;

a switch set, coupled between the capacitor and an output end of the fingerprint recognition driving device, providing the corresponding processed sensing signal with the first polarity or the second polarity to the output end of the fingerprint recognition driving device.

6. The fingerprint recognition driving device according to claim 5, wherein the switch set comprises:

a second switch, coupled between the output end of the fingerprint recognition driving device and the first end of the capacitor;

a third switch, coupled between the output end of the fingerprint recognition driving device and the second end of the capacitor;

a fourth switch, coupled between the reference voltage and the first end of the capacitor; and a fifth switch, coupled between the reference voltage and the second end of the capacitor.

7. The fingerprint recognition driving device according to claim 1, wherein each of the signal processing circuits comprises:

a first current mirror, receiving the corresponding sensing signal and generating a first mirror signal according to the corresponding sensing signal;

a second current mirror, receiving the first mirror signal and generating a second mirror signal according to the first mirror signal;

an integrating circuit, receiving the first mirror signal or the second mirror signal and generating the corresponding processed sensing signal by integrating the first mirror signal or the second mirror signal; and a sample and hold circuit, coupled to the integrating circuit for sampling and holding a signal on the output end of the integrating circuit to obtain the corresponding processed sensing signal.

8. The fingerprint recognition driving device according to claim 7, wherein each of the signal processing circuits further comprises:

a first switch, coupled between the first current mirror and the second current mirror, for transmitting the first mirror signal to the second current mirror;

a second switch, coupled between the first current mirror and the integrating circuit, for transmitting the first mirror signal to the integrating circuit; and a third switch, coupled between the second current mirror and the integrating circuit, for transmitting the second mirror signal to the integrating circuit.

9. The fingerprint recognition driving device according to claim 8, wherein turned on or cut off statuses of the first switch and the second switch are different, and the turned on or cut off status of the first switch and a turned on or cut off status of the third switch are same.

10. The fingerprint recognition driving device according to claim 1, wherein each of the signal processing circuits comprises:

a buffer, receiving the corresponding sensing signal and generating a first control signal and a second control signal;

a driving circuit, coupled to the buffer and an output end of the fingerprint recognition driving device, generating a driving signal according to the first control signal and a second control signal;

a current mirror set, coupled to the driving circuit and the output end of the fingerprint recognition driving device, and converting a polarity of the driving signal to generated a converted driving signal; and a sample and hold circuit, coupled to the output end of the operation amplifier, wherein each of the sample and hold circuits samples and holds the driving signal or the converted driving signal to obtain the corresponding processed sensing signal.

11. W The fingerprint recognition driving device according to claim 10, wherein each of the signal processing circuits further comprises:

a first switch set, coupled between the driving circuit and the output end of the fingerprint recognition driving device;

a second switch set, coupled between the driving circuit, the current mirror set and the output end of the fingerprint recognition driving device.

12. The fingerprint recognition driving device according to claim 11, wherein when the first switch set connects the driving circuit with the output end of the fingerprint recognition driving device, the second switch disconnects the current mirror set with the output end of the fingerprint recognition driving device, when the first switch set disconnects the driving circuit with the output end of the fingerprint recognition driving device, the second switch connect the current mirror set with the output end of the fingerprint recognition driving device.

13. The fingerprint recognition driving device according to claim 1, further comprising:

a sensing result generator, coupled to the signal processing circuits, generating a sensing result according to the plurality of output signals of the plurality of sensing periods.

14. The fingerprint recognition driving device according to claim 13, wherein the sensing result generator performs an operation on the output signals during the plurality of sensing periods to generate the sensing result.

15. The fingerprint recognition driving device according to claim 13, wherein each of the signal processing circuits further set the processed sensing signals which is the first polarity to zero.

16. The fingerprint recognition driving device according to claim 13, wherein the sensing result generator further comprises an analog-to-digital converting circuit.

17. The fingerprint recognition driving device according to claim 1, wherein each of the light sensors comprises:

a photo diode, coupled to the corresponding signal processing circuit; and a capacitor; coupled with the photo in parallel.

18. The fingerprint recognition driving device according to claim 1, wherein each of the light sensors further comprises:

a signal amplifier, coupled between the photo diode and the corresponding signal processing circuit, wherein the signal amplifier is configured to amplify the corresponding sensing signal.

* * * * *